H. L. QUICK.
STEREOSCOPIC MOTION PICTURE CAMERA.
APPLICATION FILED JAN. 29, 1916.
1,311,008.
Patented July 22, 1919.
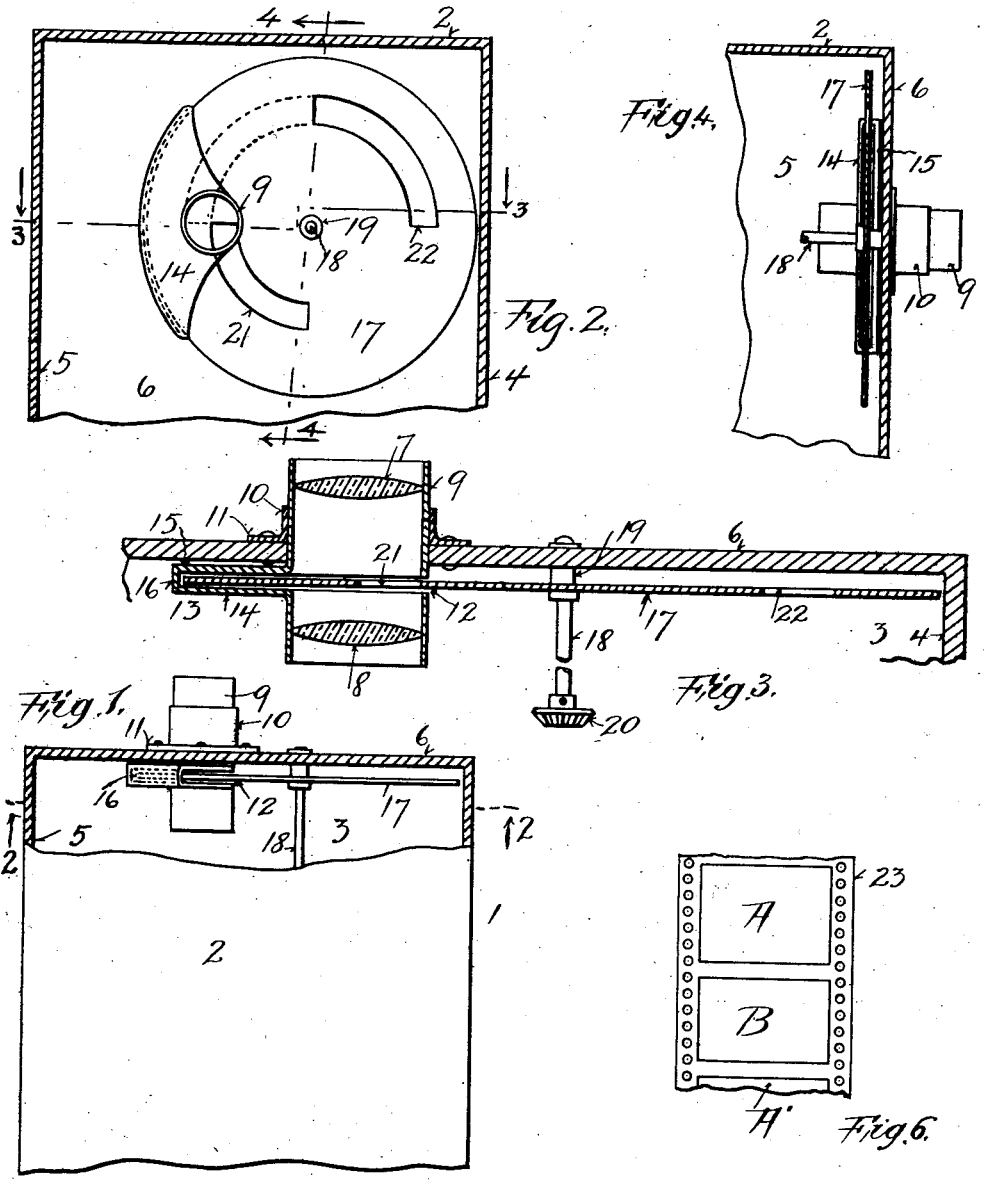
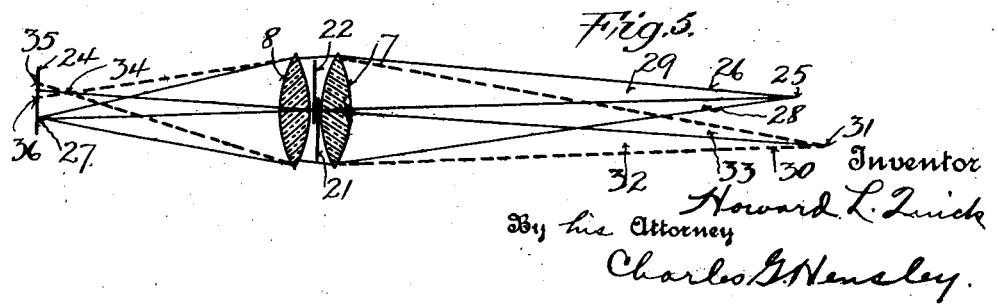
Inventor
Howard L. Quick
By his Attorney
Charles G. Hensley.

UNITED STATES PATENT OFFICE.

HOWARD L. QUICK, OF BROOKLYN, NEW YORK.

STEREOSCOPIC MOTION-PICTURE CAMERA.

1,311,008.      Specification of Letters Patent.     Patented July 22, 1919.

Application filed January 29, 1916. Serial No. 74,988.

*To all whom it may concern:*

Be it known that I, HOWARD L. QUICK, a citizen of the United States, and a resident of the borough of Brooklyn, city of New York, county of Kings, and State of New York, have invented certain new and useful Stereoscopic Motion-Picture Cameras, of which the following is a specification.

The object of my invention is to provide a camera for taking successive pictures of objects in motion, which will record the objects on the film stereoscopically. It has heretofore been proposed to take a plurality of pictures simultaneously through a plurality of lenses arranged close to each other, and to repeat the operation rapidly so that a double row of pictures were formed on the same film, and when the positives were projected in a projecting camera so as to superimpose the pictures from the separate rows a stereoscopic effect was produced. The difficulty with such a method is that the film has to be twice as wide (or more) than the ordinary film in order to accommodate the double row of exposures. Another disadvantage of the method is, that special stereoscopic projecting cameras are required to project the pictures, and this presents many disadvantages. With my present invention stereoscopic films may be produced which may be projected with any standard projecting camera and, also, the film may be of standard size, and it need be no longer for a given scene than the nonstereoscopic films ordinarily used.

The broad object of the present device is to take pictures in rapid succession in such manner that alternate exposures will be relatively stereoscopic as to each other. All the exposures are arranged successively in line lengthwise of the film, as distinguished from a side by side arrangement above referred to. If, say, a thousand exposures would be necessary for a given scene with the ordinary motion picture taking camera, no greater number will be required in the present case, although a greater number may be made if desired. Instead of using a plurality of lenses to project and superimpose the pictures, in the present case all the pictures may be projected successively through the same lens. The pictures are superimposed by illusion, so that the mental impression is the same, or substantially the same, as if a plurality of stereoscopic pictures were simultaneously projected.

When the present invention is employed in all its aspects it is possible to avoid the necessity of providing "matched" lenses, both in the taking and in the projecting cameras.

In the drawings forming part of this invention,

Figure 1 is a plan view of a camera embodying my invention in the preferred construction, in which view, part of the box is broken away to show the interior parts, Fig. 2 is a sectional view, taken on the line 2—2 of Fig. 1, Fig. 3 is a sectional view, on an enlarged scale, taken on the line 3—3 of Fig. 2, Fig. 4 is a sectional view, taken on the line 4—4 of Fig. 2, Fig. 5 is a diagrammatic view showing the principle on which the device operates, and Fig. 6 is a face view of a portion of the film, showing the arrangement of the pictures.

While it is not necessary to confine the device to a camera having but one lens for taking all the pictures, nevertheless I prefer such an arrangement because of its simplicity, and I will describe the invention in such an embodiment without, however, intending to limit this case to such an embodiment.

The camera box 1, may be of any construction, it being understood that suitable mechanism will be provided for advancing a sensitized medium such as a film, step by step and that suitable reels will be provided for letting off and taking up the film. The ordinary motion picture taking camera as now commonly used may be employed in its entirety except that the lens casing may require modification and the exposure shutter herein described will replace the one generally used.

The camera box herein shown consists of a top 2, a bottom 3, sides 4, 5, a front 6, and a bottom (not shown).

The lens, here shown as comprising front and rear combinations 7 and 8, is mounted in a casing or lens tube 9 in any desired manner, and the lens casing is herein shown as being held by a sleeve 10 having a flange 11 secured to the front 6 of the camera. One portion of the circumference of the casing has an open slot 12 whereas there is a housing 13 on one side, which consists of sector like plates 14, 15 extending laterally from the casing and connected by an intermediate portion 16. This arrangement serves to hold the portions of the lens casing firmly together and the housing serves to inclose a portion of the perimeter of the shutter.

The shutter is here shown of simple construction which, however, may be modified in any desired way. The shutter consists of a flat, circular disk 17 fixed to a shaft 18, suitably supported in a bearing 19. The shaft 18 may be turned by any of the known devices for operating motion picture camera shutters, and in the drawing I have shown a miter gear 20, which may be connected with the film shifting mechanism.

The shutter is provided with exposure apertures 21 and 22, which may be shaped as shown and which may be duplicated at any desired intervals around the shutter; that is, they may be made shorter and multiplied as many times as desired in their respective circles.

The openings 21, 22 are arranged to come alternately in line with the lens, or rather portions thereof. The openings 21, 22, are shown of sector shape and the former, 21, arranged nearer to the center of the shutter than the opening 22. The result of this is, that as the openings alternately come before the lens they permit light rays to pass alternately through different portions of the lens, the relative displacement of the openings being sufficient to create a stereoscopic effect. The shutter should be placed in a plane cutting through the optical center of the lens in order to avoid exposing only portions of the whole view to the film as the exposure apertures come alternately opposite the lens.

If the shutter, 17, is revolved synchronously with the film advancing mechanism and so that the opening 21 therein is in line with a portion of the lens during one exposure position of the film and so that the opening 22 is in line with a portion of the lens during the next succeeding exposure position of the film and the operation is repeated, then successive exposures will be made through these respective apertures. If the strip 23 shown in Fig. 6 represents the film which has been thus exposed then the exposure A will have been made through the aperture 21 and the exposure 13 will have been made through the aperture 22, or vice versa. If in the order first named, then the next exposure, A', will have been made through the aperture 21, and so on, throughout the length of the film.

Now the objects in the exposure A will not be in exactly the same position as those in exposure B, even if they remained stationary while both exposures were being made, but they will be slightly stereoscopic as to each other. This is due to the fact that these two exposures were made through different portions of the lens which caused a slight displacement of the objects in the two exposure areas, in a similar manner, but to a somewhat lesser degree than if the exposures were made through a pair of lenses arranged side by side. While I do not exclude a plural lens arrangement, nevertheless there are advantages in taking the stereoscopic pictures through different portions of the same lens. The relationship of the two sets of exposures never vary and it is not necessary to have "matched" lenses. The invention, when a single lens is used, may be applied to cameras now in use, at a very moderate expense.

The principles of my invention when embodied in a one lens arrangement are graphically illustrated in Fig. 5. Herein the lens combinations are shown at 7 and 8 and the shutter openings are indicated by the black lines 21 and 22. In this view these openings are indicated as traveling in slightly overlapping paths, which arrangement is preferable in order to provide a better blending of the pictures when projected. In this view the line 24 represents the plane of the sensitized film. Considering any point 25 in the scene being photographed, the rays of light therefrom tend to pass in the form of a cone 26 through the lens and to focus on a point 27 on the film plane. If the aperture 21 comes before the lens (all other portions of the lens being shut off at that time), only the rays in one-half, 28, of the cone of rays of light are permitted to pass through the lens and these are focused on the point 27 of the film plane. If, following this, an aperture 22 only, comes before the lens then the other half, 29, of the cone of light rays pass through another portion of the lens and they are focused on the point 27. Between these two periods, as above explained, the film is advanced to a new exposure position. If the point 25 be exactly in focus on the film plane at the point 27 then there will be no exact stereoscopic result at this point but any point before or behind the point 25 will produce a stereoscopic effect and this will make the point 27 seem stereoscopic.

This may be illustrated in connection with the dotted lines 30. An object at the point 31 which is behind the plane of the point 25 in the scene, will appear stereoscopic in each set or pair of exposures at the plane 24, because the rays of light in the separate halves 32, 33 of the separate cone of rays 30 cross at the point 34 which is slightly in advance of the plane 24, and they record at different relative positions 35, 36, on the plane 24. The image at the point 31 will, in the two successive exposures, be recorded at two relatively different positions on the plane 24 and this will give rise to the stereoscopic effect.

If an object, such as a person, be positioned at the point 25 and another object be positioned behind or nearly behind the person the stereoscopic effect will not be very pronounced as to the person except in so far as the stereoscopic effect on the adjacent object which is truly stereoscopic, renders the person stereoscopic.

In any form of the invention the displaced or stereoscopic exposures are arranged in consecutive order on the film or they may be said to follow each other in the line of the film, except as to their slight stereoscopic displacement one to the other. A film made in a camera embodying my invention may be placed in any ordinary projecting camera and be projected in the usual manner. As alternate pictures are slightly displaced sidewise in relation to each other they will be so projected on the screen. As they are projected rapidly the different exposures are mentally superimposed, giving the effect of perspective, the same as when two pictures are viewed through a simple stereoscope. At the same time the objects in the picture will appear as moving.

Having described my invention, what I claim is:

1. In a device of the class described, the combination of a camera for taking successive pictures of objects in motion, and means for recording the subject on a sensitized medium or film and including a lens through which all the exposures are made and means for alternately opening different portions of the lens whereby alternate exposures will record the subject stereoscopically and with all the exposures in substantial alinement lengthwise of the sensitized medium.

2. In a device of the class described the combination of a camera for taking successive pictures of objects in motion, and means for recording the subject on a sensitized medium or film and including a lens through which all the exposures are made and means arranged at the focal center of the lens for alternately opening different portions of the lens whereby alternate exposures will record the subject relatively stereoscopically and with all the exposures in substantial alinement lengthwise of the sensitized medium.

3. In a device of the class described, the combination of a camera for taking successive pictures of objects in motion, and means for recording the subject on a sensitized medium and including a lens through which all the exposures are made, and a shutter having apertures arranged to alternately open different portions of the lens, whereby alternate exposures will record the subject relatively stereoscopically.

4. In a device of the class described, the combination of a camera for taking successive pictures of objects in motion, and means for recording the object on a sensitized medium and including a lens through which all the exposures are made, and a shutter arranged in a plane passing through the focal center of the lens and having apertures arranged at different distances from its center whereby, when said shutter is revolved different portions of said lens will be alternately opened.

Signed at the city, county and State of New York, this 27th day of January, 1916.

HOWARD L. QUICK.